United States Patent

Kiene et al.

[11] Patent Number: 5,327,787
[45] Date of Patent: Jul. 12, 1994

[54] ELECTROMAGNETIC FLOW METER WITH WEIR

[75] Inventors: Wilfried Kiene, Munden; Peter Nissen, Rosdorf, both of Fed. Rep. of Germany

[73] Assignee: Fischer & Porter Company, Warminster, Pa.

[21] Appl. No.: 930,983

[22] Filed: Aug. 17, 1992

[30] Foreign Application Priority Data

Aug. 21, 1991 [DE] Fed. Rep. of Germany ....... 4127694

[51] Int. Cl.⁵ .................................................. G01F 1/00
[52] U.S. Cl. .................................... 73/861.12; 73/215
[58] Field of Search ................. 73/215, 861.12, 861.15, 73/861.16

[56] References Cited

U.S. PATENT DOCUMENTS

| | | | |
|---|---|---|---|
| 3,269,180 | 8/1966 | Schreiber | 73/215 |
| 3,991,614 | 11/1976 | Ditzler | 73/215 |
| 4,127,032 | 11/1978 | Martig, Jr. | 73/215 |

FOREIGN PATENT DOCUMENTS

| | | |
|---|---|---|
| 2510762 | 9/1975 | Fed. Rep. of Germany . |
| 2814833 | 10/1979 | Fed. Rep. of Germany ........ 73/215 |
| 9103046.3 | 7/1991 | Fed. Rep. of Germany . |
| 4016378 | 11/1991 | Fed. Rep. of Germany . |
| 2223099 | 3/1990 | United Kingdom . |

*Primary Examiner*—Herbert Goldstein
*Attorney, Agent, or Firm*—Ratner & Prestia

[57] ABSTRACT

A weir is placed across a pipe section and an electromagnetic flow meter with multiple electrodes is located upstream of the weir. The liquid level and velocity of fluid in the pipe section are evaluated by the electromagnetic flow meter to determine flow rate.

9 Claims, 2 Drawing Sheets

5,327,787

ELECTROMAGNETIC FLOW METER WITH WEIR

BACKGROUND OF THE INVENTION

The present invention relates to a device to measure the flow of fluids containing electrical charges and which has (1) an essentially horizontal pipe section in which the fluid flows and which is at least electrically insulating on its inner side, (2) a magnet arrangement which generates a magnetic field essentially diametrically in the pipe section, (3) an electrode arrangement which responds to a shift of the charges in the fluid which flows perpendicularly through the magnetic field, and (4) an evaluation circuit controlled by the electrode arrangement which produces an output signal corresponding to the fluid flowrate and which also takes into account the level of the fluid.

Devices of this kind are known from German Patent Applications P 31 26 965 and P 40 10 727 and from the European Patent Application 90 106 783.

SUMMARY OF THE INVENTION

The present invention is based on the fact that the height of the fluid in a weir is a measure of the flowrate as described in the "Handbuch der Wassermessung" [handbook for water metering] published by Verlag R. Oldenbourg, Munich-Vienna 1965, pages 178 to 182. Therefore, if the height of the fluid level in the weir is determined by the electrode arrangement, a correction factor can be established which can be used to improve the flowrate measurement.

An objective of the present invention is to provide a device which will provide a particularly exact measurement of the fluid flowrate.

This objective is achieved by a weir located downstream of the electrode arrangement in the pipe section to stem the flow with the evaluation circuit calibrated to take into consideration the dimensions of the weir.

In order to evaluate especially low fluid levels in the weir, the weir has a decreasing flow cross section towards its bottom.

In a particular embodiment of the present invention which results in an improvement of known evaluation circuits, the electrode arrangement includes electrodes located at various heights, the evaluation circuit includes a detector circuit that makes a measurement approximating the level of the fluid in the pipe section, and a signal from the detector circuit controls an output correcting circuit.

DETAILED DESCRIPTION OF THE INVENTION

Figure 1:
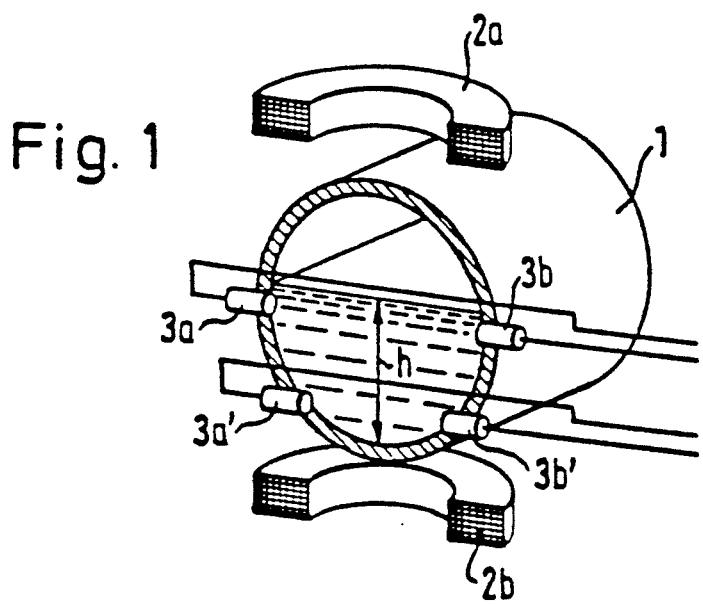
FIG. 1 shows partially in perspective and partially schematically the device, constructed in accordance with the present invention, upstream of the weir

The figures show a pipe section 1 which has an electrically insulating material on its inner surface and two electromagnets $2a$, $2b$ for the generation of a magnet field which passes through the pipe section in an essentially diametrical direction. Also shown are two electrodes $3a$, $3b$, affected by the charge shift in the fluid, whose central connecting axis X is essentially diametrical to the pipe section 1 and essentially perpendicular to the central connecting axis Y of the two electromagnets $2a$, $2b$. The electromagnets $2a$, $2b$ are connected through off/reversing switches 4, 5 to a supply device 13. By suitable changing of the switches, the electromagnets $2a$, $2b$ can be connected in series, and, to alter the excitation of the electromagnet $2a$ or the electromagnet $2b$, an additional winding can be provided on electromagnet $2a$ or electromagnet $2b$, which can be excited in a direction opposite to the excitation direction of the main electromagnet. The electrodes $3a$, $3b$ are connected to a signal amplifier 6 whose output is connected to a signal switching element 7. A timing circuit 11 switches, in synchronization with the off/reversing switches 4, 5, the output channels of the signal switching element 7 which can be directed, for example, to a signal memory 8 when the polarities of the electromagnets $2a$, $2b$ are in the same direction, to a signal memory 9 when the polarities of the electromagnets $2a$, $2b$ are in opposition, and to signal memory 10 when the electromagnets $2a$, $2b$ are turned off. The signals stored in the signal memories 8, 9, 10 are processed, using empirical parameters, in the first correction circuit 12 so that the signal at the output 14 of the correction circuit 12 is essentially free of the distortions of the flow profile in the pipe section 1, especially for deviations from axisymmetry.

Below electrodes $3a$, $3b$ are located two additional electrodes $3a'$, $3b'$ which also are affected by the charge shift in the fluid. The central connecting axis X' of electrodes $3a'$, $3b'$ also is essentially perpendicular to the pipe section 1 and essentially perpendicular to the central connecting axis Y of the two electromagnets $2a$, $2b$.

The timing circuit 11 additionally controls the signal switching element 7' which feeds the signal from the signal amplifier 6' which is connected to the electrodes $3a'$, $3b'$ to the second signal memories 8', 9', 10', which correspond to signal memories 8, 9, 10 and the various switch conditions of electromagnets $2a$, $2b$. The signals stored in the signal memories 8', 9', 10' also are supplied to the first correction circuit 12 to be processed, using empirical parameters, to provide an output signal 14.

For partially full conditions in the pipe section 1, the first correction circuit 12 provides an output signal 14 corresponding to the partially full condition.

Figure 2:
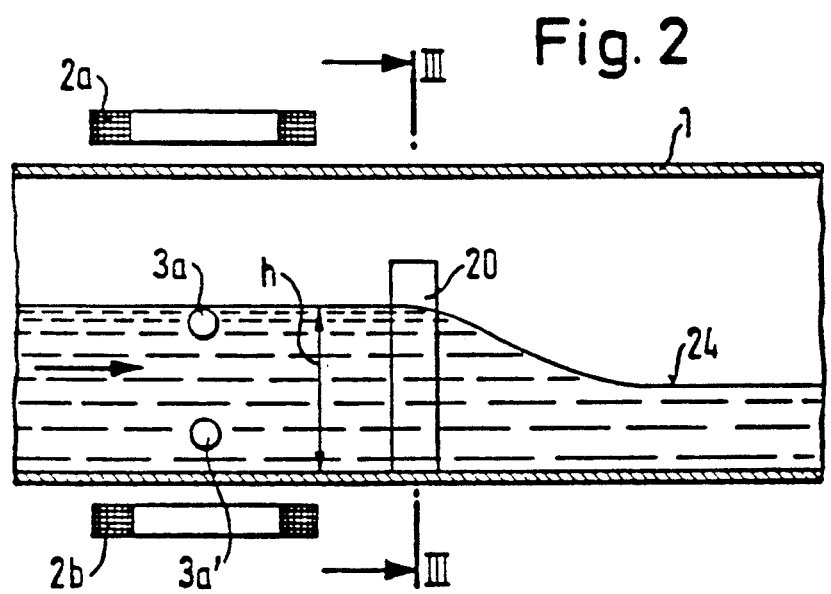
FIG. 2 shows an axial cross section through the device
Figure 3:
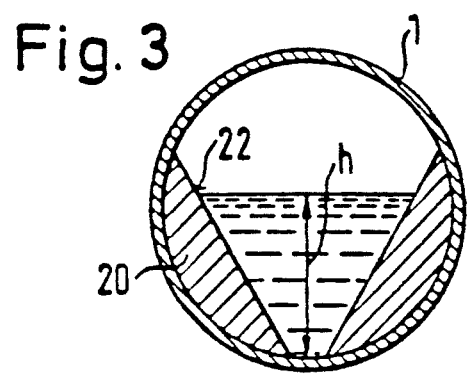
FIG. 3 shows a cross section through the weir taken along line III—III of FIG. 2

A partially full condition is indicated in FIG. 1, FIG. 2 and FIG. 3 by the level h designation. This partially full condition exists upstream of the weir 20, which has a decreasing flow cross section 22 toward its bottom. Downstream of the weir 20, the level h decreases as is shown by the level depiction 24.

Figure 4:
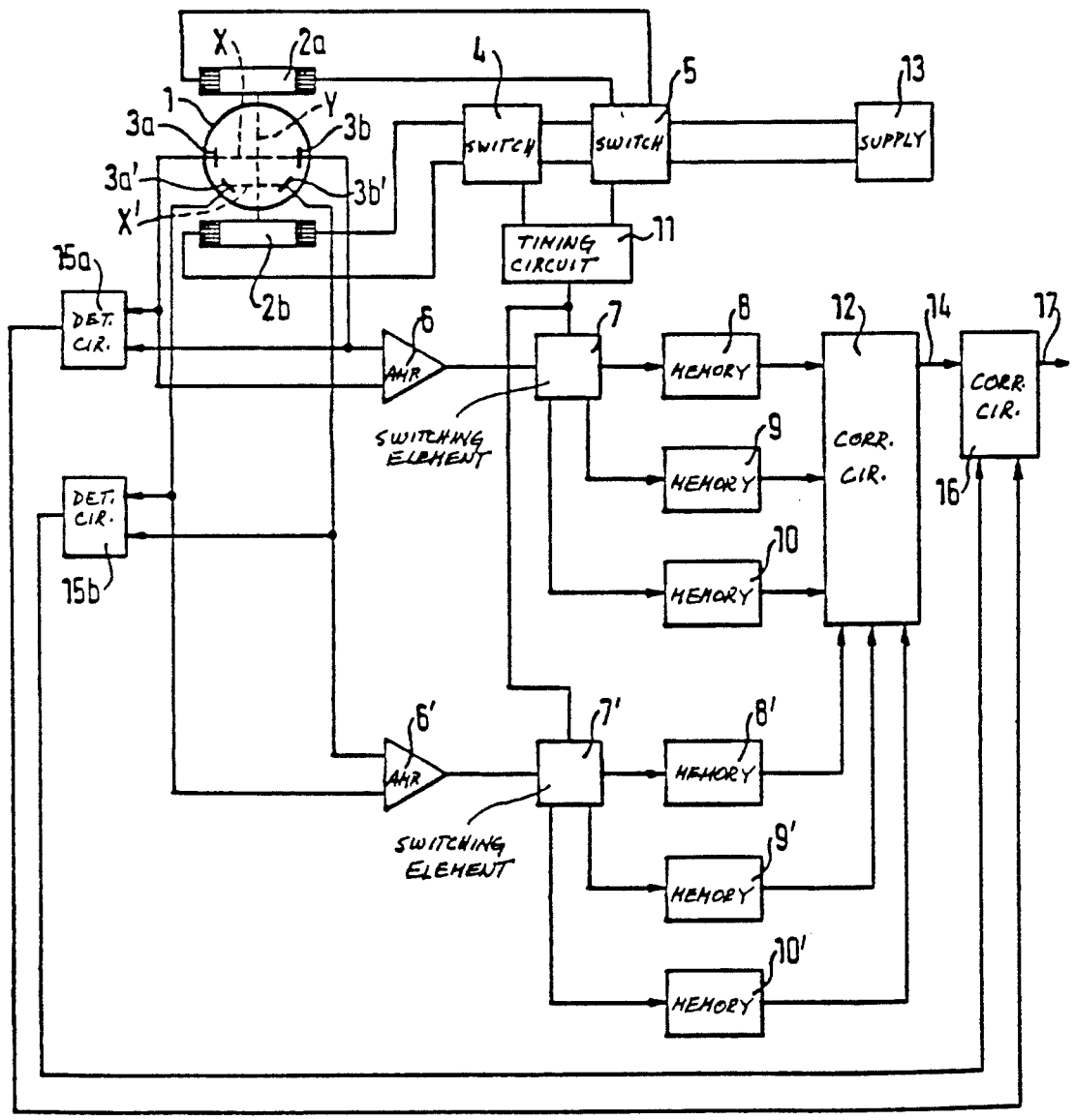
FIG. 4 shows the schematic arrangement of the evaluation circuit, basically as it is described in the European Patent Application 90 106 783, however with improvements in accordance with the present invention.

The level upstream of the weir 20 is measured by the electrode arrangement $3a$, $3b$, $3a'$, $3b'$. A detector circuit $15a$ is connected to electrodes $3a$, $3b$ as shown in FIG. 4 and a detector circuit $15b$ is connected to electrodes $3a'$, $3b'$. The detector circuits $15a$, $15b$ recognize even a partial utilization of the inner surface of the pipe section 1 in the regions of the electrodes $3a$, $3b$ or $3a'$, $3b'$ and provide corresponding output signals to a second correction circuit 16 which takes into consideration the level in the weir 20 and thereby provides an improvement of the flow measurement signal.

What is claimed:

1. A device to measure the flow of fluid containing electrical charges, said device comprising:
   a generally horizontal pipe section having an electrically insulated inner surface and through which fluid flows;
   magnet means for generating a magnetic field which extends diametrically of said pipe section;
   electrode means responsive to shifts in charges in said fluid which flows through said pipe section and the level of said fluid which flows through said pipe section for sensing the flowrate of said fluid which flows through said pipe section.
   a weir positioned downstream of said electrode means and extending across said pipe section for stemming the flow of said fluid which flows through said pipe section;
   and evaluation circuit means responsive to said electrode means and calibrated by the characteristics of said weir which affect the flow of said fluid which flows through said pipe section for developing an indication of the flowrate of said fluid which flows through said pipe section.

2. A device according to claim 1 wherein said weir has a cross-section which decreases towards the bottom of said weir.

3. A device according to claim 1 wherein said evaluation circuit means include:
   (a) signal processing and storage means responsive to said electrode means for storing first signals representative of shifts in charges in said fluid which flows through said pipe section,
   (b) fluid level measuring means responsive to said electrode means for developing second signals representative of the height of said fluid which flows through said pipe section, and
   (c) means responsive to said first and said second signals for developing said indication of flowrate of said fluid which flows through said pipe section.

4. A device according to claim 3 wherein:
   (a) said electrode means include a plurality of pairs of electrodes positioned at selected heights, and
   (b) said fluid level measuring means include a plurality of detector circuits, one associated with each pair of said electrodes, which develop said second signals representative of the height of said fluid which flows through said pipe section.

5. A device according to claim 2 wherein said evaluation circuit means include:
   (a) signal processing and storage means responsive to said electrode means for storing first signals representative of shifts in charges in said fluid which flows through said pipe section,
   (b) fluid level measuring means responsive to said electrode means for developing second signals representative of the height of said fluid which flows through said pipe section, and
   (c) means responsive to said first and said second signals for developing said indication of flowrate of said fluid which flows through said pipe section.

6. A device according to claim 5 wherein:
   (a) said electrode means include a plurality of pairs of electrodes positioned at selected heights, and
   (b) said fluid level measuring means include a plurality of detector circuits, one associated with each pair of said electrodes, which develop said second signals representative of the height of said fluid which flows through said pipe section.

7. Device to measure the flow of fluids containing electrical charges with an essentially horizontal pipe section in which the fluid flows and which is at least electrically insulating on its inner side, with a magnet arrangement which generates a magnetic filed essentially diametrically in the pipe section, with an electrode arrangement which responds to a shift of the charges in the fluid which flows perpendicularly through the magnetic field, and with an evaluation circuit controlled by the electrode arrangement which produces an output signal corresponding to the fluid flowrate and which also takes into account the level of the fluid, further including a weir located downstream of the electrode arrangement in the pipe section and extending across the pipe section to stem the flow and wherein the evaluation circuit is calibrated taking into consideration the dimensions of the weir.

8. Device in accordance with claim 7 wherein said weir has a decreasing cross-section for flow towards its bottom.

9. Device in accordance with claim 8 wherein:
   (a) said electrode arrangement contains electrodes located at various heights, and
   (b) said evaluation circuit contains:
      (i) a detector circuit that makes a measurement approximating the level of the fluid in the pipe section, and
      (ii) an output correcting circuit responsive to said detector circuit.

* * * * *